July 22, 1924.
N. GRUENEICH
1,502,500
DIRIGIBLE HEADLIGHT CONSTRUCTION FOR MOTOR VEHICLES
Filed April 13, 1923    2 Sheets-Sheet 1
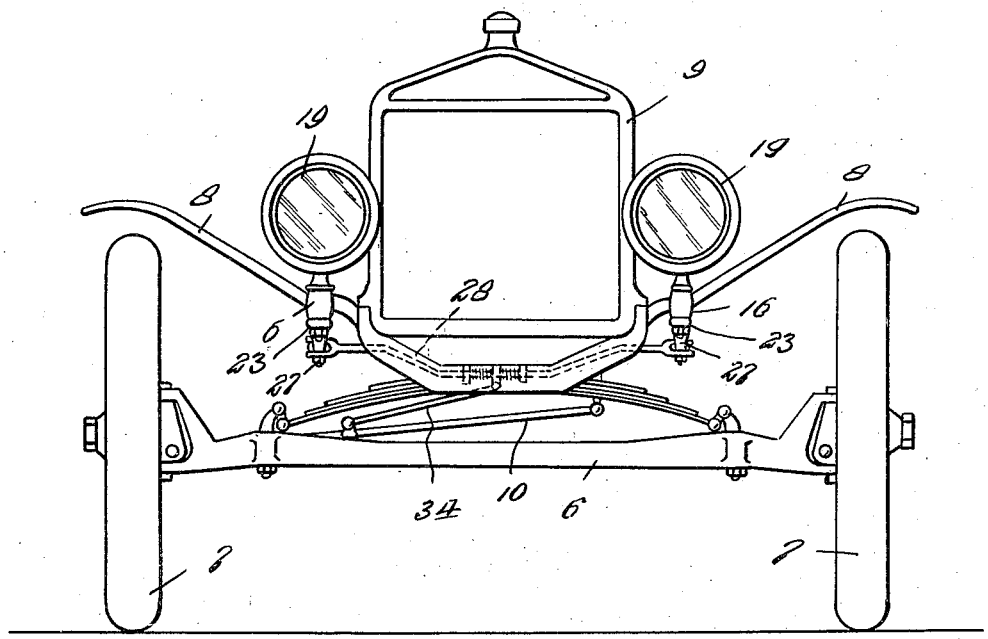
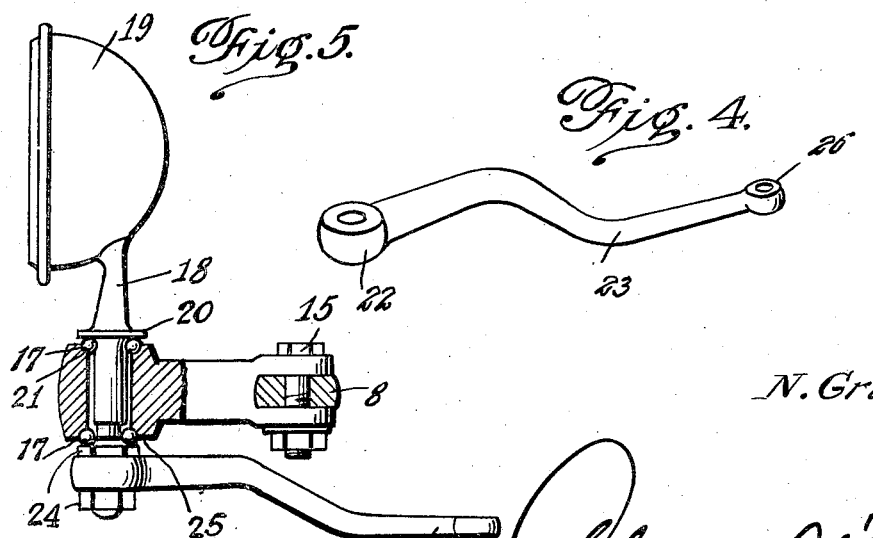
N. Grueneich, Inventor July 22, 1924. 1,502,500
N. GRUENEICH
DIRIGIBLE HEADLIGHT CONSTRUCTION FOR MOTOR VEHICLES
Filed April 13, 1923 2 Sheets-Sheet 2
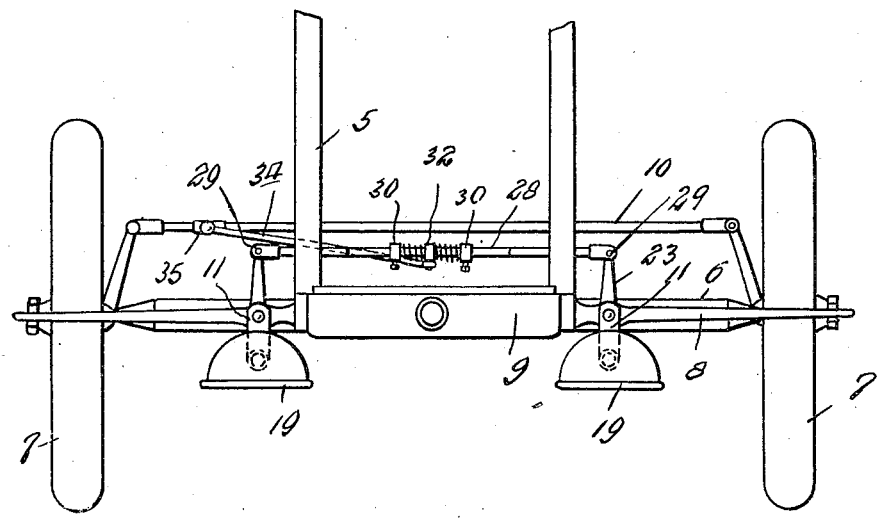
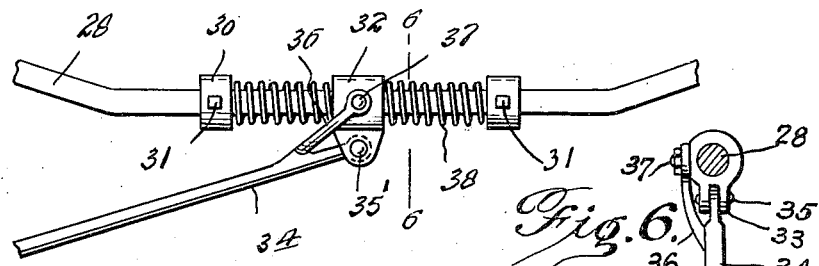
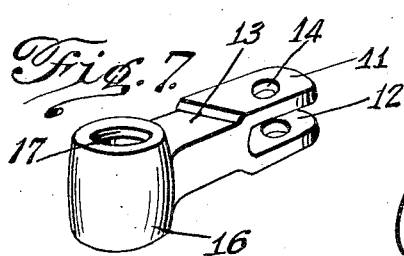
N. Grueneich,
Inventor Patented July 22, 1924.

1,502,500

UNITED STATES PATENT OFFICE.

NATHANIEL GRUENEICH, OF LONG LAKE, SOUTH DAKOTA.

DIRIGIBLE HEADLIGHT CONSTRUCTION FOR MOTOR VEHICLES.

Application filed April 13, 1923. Serial No. 631,780.

*To all whom it may concern:*

Be it known that I, NATHANIEL GRUENEICH, a citizen of the United States, residing at Long Lake, in the county of McPherson and State of South Dakota, have invented certain new and useful Improvements in Dirigible Headlight Constructions for Motor Vehicles, of which the following is a specification.

In carrying out the present invention, it is my purpose to provide a dirigible headlight construction, principally adapted for association with motor vehicles of the Ford type, the nature of the same being such as to permit of the attachment of this headlight construction to these automobiles, without in any manner whatever altering the original construction thereof, with the exception of removing the usual headlights from their supporting brackets.

A further purpose of the invention resides in the provision of such a vehicle headlight construction that may be associated with the said type of vehicles in a novel and expeditious manner, the nature of the same being such as to embrace the desired features of simplicity, durability and efficiency, the invention comprising relatively few parts, and these so correlated as to reduce the liability of derangement to a minimum.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a front elevation of a Ford type automobile with the front fenders removed, and equipped with my improved headlight construction.

Figure 2 is a top plan view thereof.

Figure 3 is an enlarged fragmentary front elevation of the specific form of connecting rod comprising this invention.

Figure 4 is a perspective of one of the arms constituting an essential part of my invention.

Figure 5 is a side elevation of one of the lamps, showing in side elevation and cross section, certain of its directly associated structural elements.

Figure 6 is a detail cross section upon the line 6—6 of Figure 3, and

Figure 7 is a perspective of one of the lamp post supporting bearings, adapted for connection to the usual fender brace rods of a motor vehicle.

Referring to the drawings, there is shown a portion of the Ford automobile including chassis bars 5, front axle 6, steering wheels 7, fender brace rods 8, a radiator 9, and a connecting rod 10 of the usual steering mechanism. It will of course be at once apparent that these elements are not of the essence of my invention, the same being found on the above mentioned type of machine, and being shown for more adequately disclosing the application of my headlight construction thereto.

In the application of my improved headlight construction to motor vehicles of this type, the usual headlights are removed from the openings, in the said fender brace rods 8, and engaging over opposite sides of the portions of these rods, that are equipped with the said openings, are legs 11 and 12 of the bifurcated relatively short arms 13, the said legs being formed with openings 14 that are lined with the said openings in the fender brace rods, whereby these arms may be secured to the rods, through the instrumentality of bolts 15.

The front ends of these arms are formed with vertical bearing collars 16, the opposite ends thereof being shouldered at 17. Adapted for positioning within these bearing collars are posts 18 of headlights 19, the said posts being equipped with flanges 20 that have contact with bearings 21 upon the upper shoulders of the bearing collars. The lower ends of the posts 18 are reduced, and have positioned thereover, the front flat and open ends 22, of rearwardly and downwardly directed connecting arms 23.

These arms are maintained upon the said reduced ends of the posts through the medium of binding nuts 24, one upon each side of said flat ends of the arms, it being also noted that between the innermost nuts 24 and the said shoulders 17 upon the lower ends of the bearing collars 21 are interposed anti-friction bearings 25. The opposite ends of the said arms 23 are also flattened, and formed with openings 26, and positioned over these flattened ends are the bifurcated ends 27 of a cross connecting rod 28. The legs forming the said bifurcated ends are provided with openings that aline with the openings 26, for the reception of pivotal connections 29.

The central portion of this connecting rod 28 is preferably bent downwardly as shown in Figure 3, and upon this downwardly bent portion and at spaced points thereon are collars 30, adjustably maintained upon the connecting rod through the medium of set screws 31. Freely slidable between the collars 30 of the rod 28 is a collar 32 formed upon its bottom side with a pair of spaced ears 33 having alined openings therein. Engaging between these ears is one end of a rod 34 that extends downwardly in a lateral direction, and is pivotally connected at 35 to the said connecting rod 10 of the vehicle steering mechanism. The end of the said rod 34 between the ears 33 is pivotally connected therebetween at 35', this rod being formed with a forwardly and upwardly inclined extension 36 that is pivotally connected at 37 to the front side of said collar 32, for thereby overcoming any tendency of this collar binding upon the connecting rod 28 as the same is moved laterally thereon in opposite directions.

Between the stationary collars 30 and the sliding collar 32 are expansion springs 38, the same adapted for taking up the shock incident between the said stationary and slidable collars, it also being at once obvious that these springs 38 will permit of a vibratory action of the vehicle steering wheels 7, without imparting a consequent movement to the lamps 19.

In view of the above description it will at once be apparent that I have provided a highly improved form headlight construction adapted for ready application upon motor vehicles, and although I have herein shown and described this headlight construction as being particularly adapted for application to automobiles of the Ford type, it is nevertheless to be understood that certain structural elements of the same may be so modified as to adapt the device to be applied to automobiles of varying types.

Having thus described my invention, what I claim as new, and desire to secure by Letters Patent is:—

In combination with an automobile machine having pivoted steering knuckles and a steering rod connected with the knuckles and bridging the space between them, a dirigible headlight mechanism comprising lamp posts pivotally mounted upon a portion of the machine which is superimposed with relation to the knuckles and which may have vertical movement with relation to the knuckles, a cross rod connected with the lamp post and disposed approximately parallel with said steering rod, collars mounted upon the cross rod at spaced intervals, a third collar slidably mounted upon the cross rod between the first mentioned collars, springs coiled about the cross rod and bearing at their inner ends against the opposite sides of the slidable collar and at their other ends against the first mentioned collars, and a rod pivotally connected with the slidable collar and disposed between the cross rod and the steering rod with its longitudinal dimensions disposed at an acute angle to both of said rods, the last mentioned rod having an angularly disposed extension also pivotally connected with the slidable collar, and means pivotally connecting the last mentioned rod with the steering rod at a point to one side of all of the collars.

In testimony whereof I affix my signature.

NATHANIEL GRUENEICH.